US006821374B2

(12) United States Patent
Greenhill

(10) Patent No.: US 6,821,374 B2
(45) Date of Patent: Nov. 23, 2004

(54) PRESSURE SENSITIVE LABEL WITHOUT PRESSURE SENSITIVE CARRIER

(76) Inventor: Kenneth Ian Greenhill, P.O. Box 3104, Milford, CT (US) 06460

( * ) Notice: Subject to any disclaimer, the term of this patent is extended or adjusted under 35 U.S.C. 154(b) by 0 days.

(21) Appl. No.: 10/457,583

(22) Filed: Jun. 9, 2003

(65) Prior Publication Data

US 2004/0131816 A1 Jul. 8, 2004

Related U.S. Application Data

(60) Provisional application No. 60/437,837, filed on Jan. 3, 2003.

(51) Int. Cl.[7] .................................... B32B 31/18

(52) U.S. Cl. .................... 156/248; 156/267; 156/270

(58) Field of Search ........................ 156/248, 247, 156/256, 267, 270, 289; 283/81, 101; 428/41.7, 41.8

(56) References Cited

U.S. PATENT DOCUMENTS 3,524,782 A * 8/1970 Buske ........................ 156/248
4,060,168 A * 11/1977 Romagnoli ................. 206/216
4,281,762 A * 8/1981 Hattemer ..................... 206/390
4,479,838 A * 10/1984 Dunsirn et al. ............. 156/247
4,767,654 A * 8/1988 Riggsbee ................... 428/41.3
4,841,712 A * 6/1989 Roou ........................... 53/412
4,846,504 A * 7/1989 MacGregor et al. ......... 283/102
4,863,772 A * 9/1989 Cross ......................... 428/41.8
5,019,436 A * 5/1991 Schramer et al. .......... 428/41.9
5,405,475 A * 4/1995 Kraft et al. .............. 156/275.5
5,658,631 A * 8/1997 Bernstein et al. .......... 428/42.1
6,420,006 B1 * 7/2002 Scott .......................... 428/40.1

FOREIGN PATENT DOCUMENTS

EP 1 034 919 * 9/2000
GB 2 200 592 * 8/1988

* cited by examiner

*Primary Examiner*—Melvin C. Mayes
(74) *Attorney, Agent, or Firm*—Greer, Burns & Crain, Ltd.

(57) ABSTRACT

A label product such as a coupon is adhered to a release liner using a temporary adhesive. A layer of pressure sensitive laminate film, preferably transparent, is applied over the coupon, extending beyond the outer edges of the coupon so that the laminate is also adhered to the release liner. When the release liner is removed, the laminate can be applied directly to a product, without the base label common in conventional label products.

4 Claims, 2 Drawing Sheets

PRESSURE SENSITIVE LABEL WITHOUT PRESSURE SENSITIVE CARRIER

This is a Continuation of Provisional Application Ser. No. 60/437,837, filed Jan. 3, 2003.

This invention relates to pressure sensitive labels, and more particularly, to pressure sensitive labels that do not have a pressure sensitive carrier.

BACKGROUND OF THE INVENTION

A common and accepted way to attach a label to a container employs a layer of adhesive, referred to as pressure sensitive adhesive. This adhesive is applied in various ways so that is completely covers the reverse side of the label. The adhesive layer, when placed in contact with a container, causes the label to adhere to the container. This assembly is known as "pressure sensitive label stock" and can take various forms. Most common forms are a paper or film substrate (which becomes the label), having had adhesive applied to the reverse side, and residing on a base layer of material that has been coated with a suitable release material, referred to as the "release liner".

Another application and extension of this technology is in the construction of what is commonly known as an "IRC" or instantly redeemable coupon. This product has the same pressure sensitive assembly (PSA), as described above, and having a second substrate (paper or film) removably attached to the top or face of the PSA by use of an adhesive. This construction allows the label assembly to be attached to a container and the top layer substrate to be cleanly removed, to allow this portion to be used for a variety of secondary purposes, most commonly as a coupon that is immediately redeemed at the cash register.

Among IRCs, the most common form has a paper top layer adhered to a clear film PSA bottom layer. This allows the coupon to be removed with minimum adulteration of the primary container, because the portion that remains is clear and essentially invisible.

This assembly, then, includes a layer of film or paper having pressure sensitive adhesive thereon and secured to a release liner. A top layer of paper is removably secured to the PSA. Since the cost of the product is determined by the total cost of these layers, it is desirable to reduce the cost of such products.

Accordingly, one object of the present invention is to provide new and improved pressure sensitive labels.

Another object is to provide new and improved pressure sensitive labels at reduced cost compared with comparable generally available label products.

SUMMARY OF THE INVENTION

In keeping with one aspect of this invention, a label product such as a coupon is adhered to a release liner using a temporary adhesive. A layer of pressure sensitive film, preferably transparent, is applied over the coupon, preferably extending beyond the outer edges of the coupon so that the laminate is also adhered to the release liner. When the release liner is removed, the laminate can be applied directly to a product, without the base label common in conventional label products.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 1:
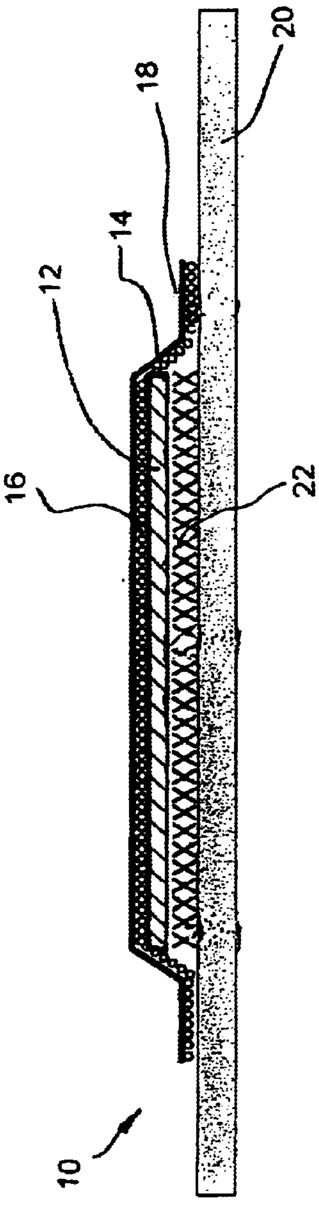
FIG. 1 is a sectional side view of a label product made in accordance with this invention.

As seen in FIG. 1, a label product 10 includes a label product 12, such as a coupon or the like, and a transparent laminate 14, adhered to one side of the coupon 12 by a layer of pressure sensitive adhesive 16. An outside edge 18 of the laminate 14 extends beyond at least two of the outside edges of the coupon 12.

As manufactured, the product 10 includes a release liner 20 to which the laminate 14 is adhered around the edges 18. The coupon 12 is temporarily adhered to the release liner 20 using a temporary adhesive 22. The adhesive 22 could be any suitable adhesive, such as an aqueous fugitive adhesive. For example, E612-11, made by Impact International of Patterson, N.J., could be used for this purpose.

Figure 2:
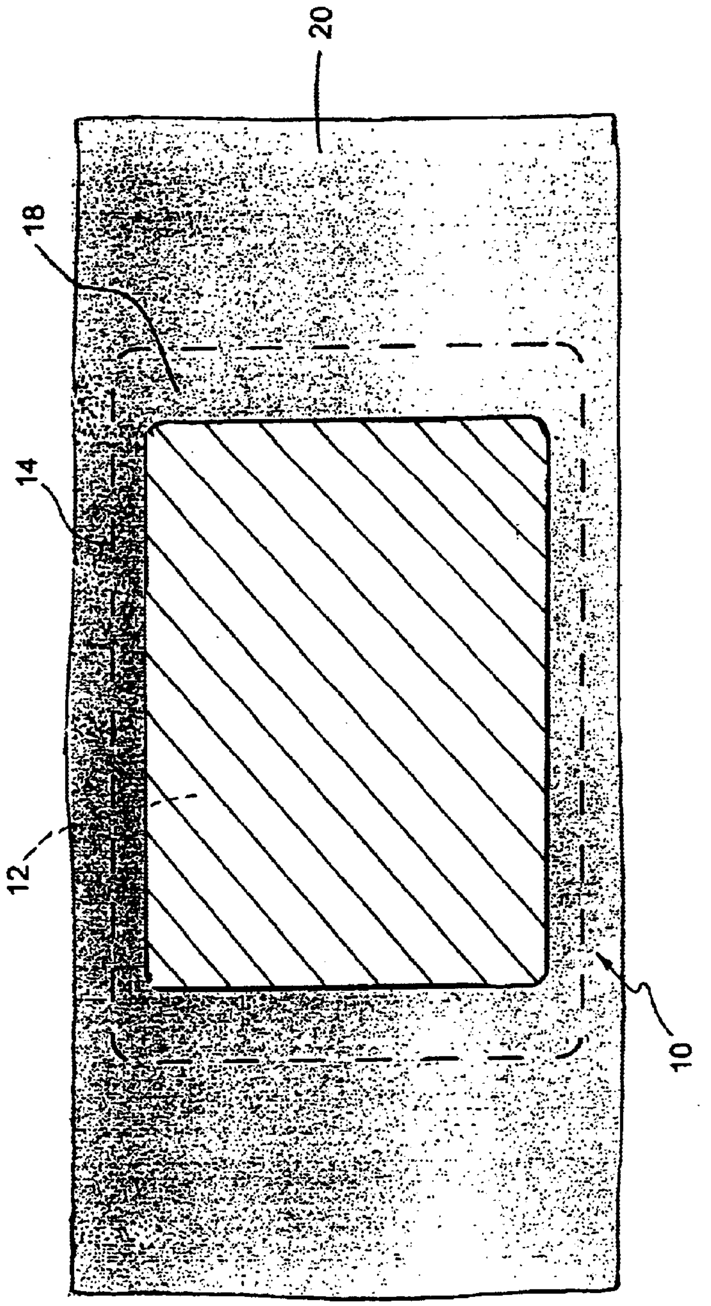
FIG. 2 is a plan view of the product shown in FIG. 1.

As seen in FIG. 2, the product 10 can be made on a web of release material, and die-cut so that a succession of products can be manufactured on a web of release material.

Figure 3:
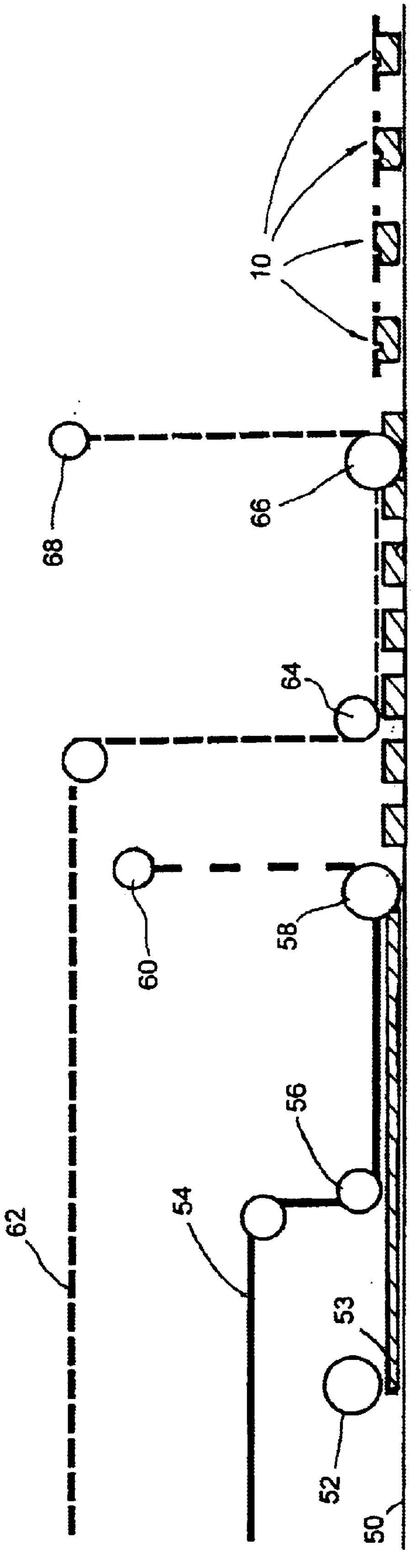
FIG. 3 is an illustration of the manufacturing process used to make the label product of FIG. 1.

The process used to make the products 10 is shown in FIG. 3. A web of release liner 50 is passed through a station 53, where patches of fugitive adhesive (or a continuous coating) are applied. The fugitive adhesive has adhesive properties initially, but loses its adhesive properties over time.

A web of paper stock 54, which can contain printed material as desired, is attached to the release liner by the fugitive adhesive at a station 56, which can be nip rollers or the like. The laminated assembly of the web 50 and 54 is die-cut through both the web 54 and preferably the fugitive adhesive applied at station 53, to the top surface of the release liner 50, at a station 58. A waste matrix produced by this die-cutting operation is removed to a station 60 and discarded.

After the waste is removed at the station 58, a die-cut shape of the web of paper stock 54 remains, temporarily attached to the release liner 50 by the fugitive adhesive 53.

A third substrate 62, typically clear pressure sensitive laminate film, is introduced over the die-cut paper stock at a station 64. The laminate film 62 could also be paper or foil, if desired. In any event, the film 62 includes pressure sensitive adhesive on the side exposed to the paper stock, which adheres the film 62 to the paper stock portions 54 and the release liner 50.

The assembly of release liner 50, the succession of paper stock products 54, and the film 64 are die-cut at a station 66, to produce a succession of products 10 on the release liner 50. This die-cutting operation can, but need not, cut through the release liner. In any event, waste material produced by the die-cutting operation at the station 66 is removed to a station 68 and discarded.

The die-cutting operation at 66 preferably die-cuts the film 62 so that the resulting paper stock products are surrounded by laminate. In this manner, when the release liner is removed, the products 10 can be easily applied to a bottle, carton or other product, by the pressure sensitive adhesive on the portion of the film 62 that surrounds the paper product 54.

While the principles of the invention have been described above in connection with specific apparatus and applications, it is to be understood that this description is made only by way of example and not as a limitation on the scope of the invention.

What is claimed is:

1. A method for producing a label product comprising the steps of:

applying temporary adhesive to a release liner;

applying a web of paper stock over the temporary adhesive and onto the release liner;

die-cutting a succession of paper stock products from the web, without die-cutting the release liner, to produce a succession of coupons temporarily adhered to the release liner;

removing the waste material produced by the die-cutting operation;

applying a laminate film having pressure sensitive adhesive to the web of release liner and spaced coupons;

die-cutting the film such that the laminate film extends beyond at least two edges of the coupons, the pressure sensitive adhesive being adhered to the coupon and the release liner; and removing the waste material created by the second die-cutting operation, whereby when said release liner is removed, said coupons can be applied directly to a product, without a base label.

2. The method of claim 1, comprising the step of cutting the resulting web of label products into plurality of individual label products.

3. The method of claim 1, wherein the temporary adhesive is applied in a succession of patches.

4. The method of claim 1, wherein the temporary adhesive is applied as a continuous coating.

* * * * *